March 29, 1960  M. C. FERRE  2,930,968
APPARATUS FOR ELECTRICAL WELL LOGGING
Filed May 31, 1956
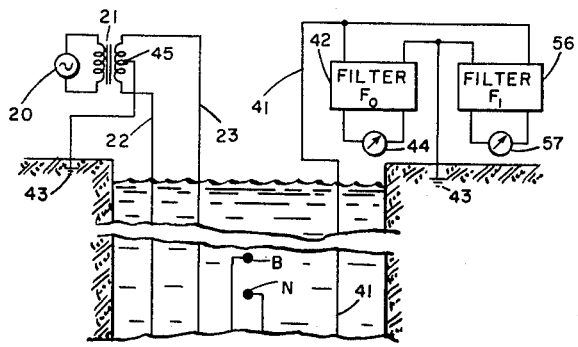
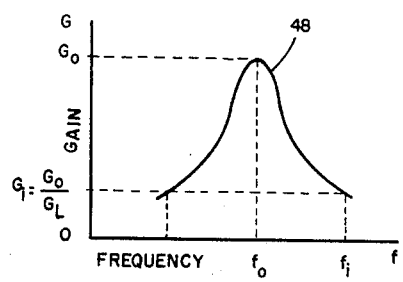
FIG. 2
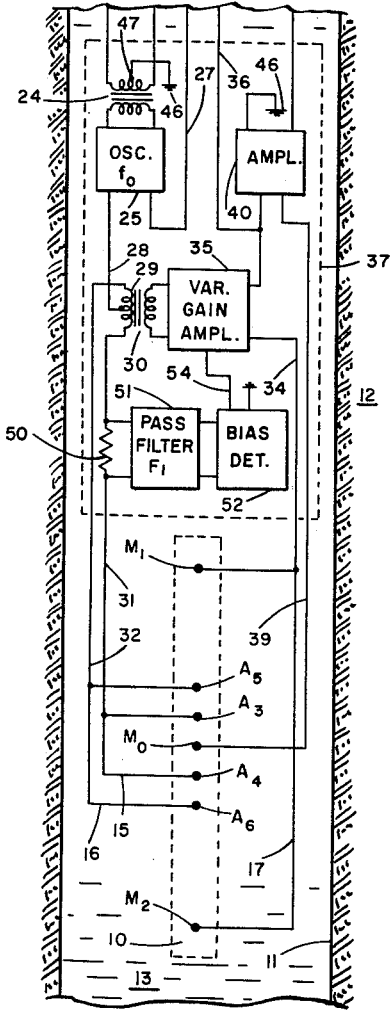
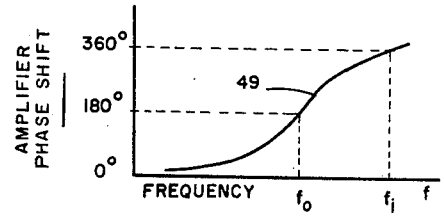
FIG. 3
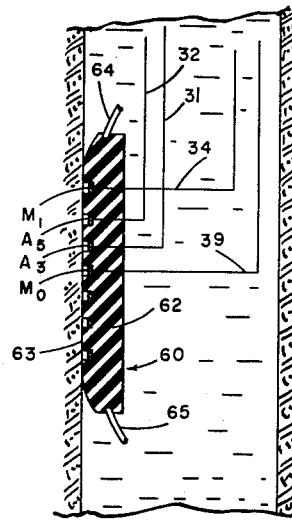
FIG. 4
FIG. 1
INVENTOR.
MAURICE C. FERRE
BY William R. Sherman
HIS ATTORNEY United States Patent Office 2,930,968
Patented Mar. 29, 1960

2,930,968

APPARATUS FOR ELECTRICAL WELL LOGGING

Maurice C. Ferre, Ridgefield, Conn., assignor, by mesne assignments, to Schlumberger Well Surveying Corporation, Houston, Tex., a corporation of Texas Application May 31, 1956, Serial No. 588,333

8 Claims. (Cl. 324—1)

This invention relates to electrical well logging and more particularly to new and improved apparatus for logging the electrical resistivity of earth formations traversed by a well drilled into the earth.

In copending application Serial No. 529,016 filed by N. A. Schuster on August 17, 1955, for "Feedback Amplifying Systems," logging systems are disclosed employing a feedback control loop to obtain a desired distribution of survey current passed from a main electrode in the borehole into adjacent formations. Control is effected by introducing an auxiliary current from an auxiliary electrode having portions spaced above and below the main electrode. The magnitude of the auxiliary current is automatically adjusted to produce a potential difference between a pair of points in the vicinity of the main and auxiliary electrodes which balances the potential difference produced between these points by the survey current. In this way, a region of substantially zero potential gradient may be established bounding the path of the survey current and extending transversely of the borehole wall. In order that this region of zero potential gradient may be established accurately and with stability under widely varying formation conditions, provision is made for regulating the feedback loop gain at a value which yields a desired accuracy and precludes such excessive loop gains as otherwise might lead to circuit instability.

The loop gain may be regulated, in accordance with these teachings, by passing an information signal distinguishable from the signals produced by the auxiliary and survey currents through that portion of the formation which most significantly affects the feedback loop again. The information signal may conveniently be derived by allowing the feedback loop to oscillate at a frequency different from the frequency of the survey current and controlling the gain of an amplifier in the feedback loop to maintain unity loop gain at the information signal frequency. The loop gain for the feedback signal is thereby maintained constant, but at a higher value.

An object of the present invention is to provide new and improved apparatus of the above described character for deriving simultaneous indications of formation resistivity having different geological significance.

It is another object of the invention to provide new and improved apparatus of the above described character for regulating well logging currents with stability and with a simplification of design requirements, while enabling the simultaneous derivation of different resistivity indications.

These and other objects are attained, in accordance with the invention, by circulating an information signal about a feedback loop which includes a variable gain amplifier for emitting auxiliary current from an auxiliary electrode. The auxiliary current is emitted at a first frequency different from the information signal frequency with a magnitude and phase to promote flow of survey current transversely of a borehole wall. To control the loop gain of the feedback loop, the magnitude of the information signal current emitted from the auxiliary electrode is regulated by adjusting the amplifier gain. Flow of the survey and information current creates corresponding potentials at a point in the vicinity of the auxiliary electrode which are distinguishable by their frequency and represent different resistivity characteristics. In one form of the invention, an electrode array extending longitudinally of the borehole is employed, while in another form the electrodes are carried on a cushion member which is urged against the borehole wall.

The invention will be better understood and others of its objects and advantages perceived, from the following detailed description taken in conjunction with the drawing, in which:

Fig. 1 is a schematic diagram of a well logging system constructed in accordance with the invention;

Fig. 2 is a graphical representation of the variation in gain with frequency for the variable gain amplifier of Fig. 1;

Fig. 3 is a graphical representation of the variation in phase shift with frequency for the variable gain amplifier of Fig. 1; and Fig. 4 is a schematic diagram of an electrode array which may be used in lieu of the electrode array illustrated in Fig. 1.

In Fig. 1 an electrical well logging system is shown having portions including an electrode array 10 disposed within a borehole 11 drilled through subterranean formations 12 and containing an electrically conductive liquid 13, such as a drilling mud. Other portions are conveniently disposed at the earth's surface and suitably may include a winch (not shown) for raising and lowering the electrode array in the borehole by means of a cable. Such cable may conveniently contain a plurality of conductors and have a conductive armored sheath which is insulated for a distance above its lower end.

The electrode array 10 is of the type disclosed in M. C. Ferre Patent No. 2,712,631, issued July 5, 1955. At a central point of the array is disposed an inner measuring electrode $M_0$ which serves to detect a potential representing formation resistivity. Spaced above and below the inner measuring electrode $M_0$ are an inner pair of current emitting electrodes $A_3$, $A_4$ connected by an insulated conductor 15, an outer pair of current emitting electrodes $A_5$, $A_6$ connected by an insulated conductor 16, and an outer pair of measuring electrodes $M_1$, $M_2$ connected by an insulated conductor 17. Because the electrodes of each pair are electrically connected or continuous, they may be considered as portions of a single electrode, these portions being symmetrically spaced with respect to the inner measuring electrode $M_0$ in longitudinal alignment.

To supply power to the portions of the system which are disposed in the borehole, suitable A.C. source means 20 at the earth's surface is coupled through a transformer 21 to the upper terminals of cable conductors 22, 23, the lower terminals of these conductors being coupled by a transformer 24 to the input circuit of an oscillator 25. Oscillator 25 may be of any suitable type serving to generate a constant A.C. current at a frequenfy $f_0$ which preferably is different from the frequency of the source 20. By way of example, source 20 may supply 60 cycle power, whereas the constant current derived from oscillator 25 may have a frequency of 400 cycles per second. While one of the output terminals of oscillator 25 is connected by conductor 27 to a remote current return electrode B, the other terminal is connected by conductor 28 to the midtap of the secondary winding 29 of transformer 30. The terminals of secondary winding 29 are coupled by insulated conductors 31 and 32, respectively, to the electrodes $A_3$, $A_4$ and to the electrodes $A_5$, $A_6$. Thus, a circuit is completed for the constant survey current at frequency $f_0$ such that survey current is passed from the inner and outer current emitting electrodes through adjacent formations and is returned at the electrode B. In practice, electrode B may be the exposed portion of the cable sheath which is spaced above the electrode array 10 by a sufficient distance, such as 75 feet, that it may function as an infinitely remote current return point.

The passage of survey current from the current emitting electrodes produces a potential difference between outer measuring electrodes $M_1$, $M_2$ and a remote reference electrode, such as electrode N. A greater lateral depth of investigation may be obtained, as taught in aforementioned Ferre Patent No. 2,712,631, by maintaining this potential difference substantially at zero. To this end, outer measuring electrodes $M_1$, $M_2$ are connected by insulated conductor 34 to one input terminal of a variable gain amplifier 35, while insulated conductor 36 connects the other input terminal to remote reference electrode N. As shown, electrode N may be spaced a distance below current return electrode B but substantially above the electrode array 10. Such arrangement is particularly suitable where such circuit elements as oscillator 25 and variable gain amplifier 35 are contained within a fluid tight housing 37 which is moved with the electrode array 10 through the borehole.

Variable gain amplifier 35 may be of any suitable design affording a relatively high gain and thus may comprise plural stages of amplification, one stage including a suitable gain control circuit to provide a variable gain. The variable gain stage may, for example, comprise a variable gain pentode with suppressor grid control.

To complete an automatic feedback loop serving to maintain the potential difference between outer measuring electrodes $M_1$, $M_2$ and reference electrode N substantially at zero, the output of variable gain amplifier 35 is applied to the primary winding of the transformer 30. So that the feedback will be degenerative, the flow of auxiliary current produced by the variable gain amplifier 35 is in phase with the survey current at the inner current emitting electrodes $A_3$, $A_4$, but 180° out of phase with the survey current at the outer current emitting electrodes $A_5$, $A_6$. The potential difference applied between the inner and outer current emitting electrodes may be appreciable, while the resultant potential difference produced by the survey and auxiliary currents between measuring electrodes $M_1$, $M_2$, and reference electrode N is substantially zero due to the relatively high amplification or gain G afforded by the amplifier 35. As taught in aforementioned Ferre Patent No. 2,712,631, the emission of auxiliary current forces the constant survey current to penetrate an appreciable lateral depth into the adjacent formations before spreading out.

Accordingly, measurements made of the potential difference produced between the inner measuring electrode $M_0$ and a remote reference point, such as reference electrode N, are accurately representative of the resistivity of materials along the path of the survey current extending to an appreciable lateral depth from the inner measuring electrode $M_0$. To obtain such measurements, inner measuring electrode $M_0$ is connected by insulated conductor 39 to an input terminal of an amplifier 40 within housing 37. The other input terminal of amplifier 40 is connected by conductor 36 to the remote reference electrode N, so that the potential difference which is to be measured is applied to the input of the amplifier. Amplifier 40 may be of any suitable type serving to amplify the potential difference to provide a measure signal of sufficient strength for transmission up the cable. A single cable conductor 41 may conveniently be employed to couple the output circuit of the amplifier 40 through a pass filter 42, which is grounded at point 43, to a suitable indicating device 44 at the earth's surface. A return circuit between filter 42 and amplifier 40 may be provided by the connection of ground point 43 to the midtap 45 of the secondary winding for transformer 21 and the connection of a ground point 46 within housing 37 to the midtap 47 of the primary winding for transformer 24. Thus, cable conductor 41 connects one output terminal of amplifier 40 to an input terminal of filter 42 while the other output terminal of amplifier 40 is connected between ground points 43 and 46 by the phantom ground return circuit to the other input terminal of filter 42.

Filter 42 may be designed selectively to pass signals of frequency $f_0$ to the indicating device 44, where the frequency $f_0$ is that of the measure signal produced as a potential difference between measuring $M_0$ and the reference electrode N by the survey and auxiliary currents. To provide a log of resistivity values as a function of the depth of inner measuring electrode $M_0$ in the borehole, indicating device 44 may conveniently be a unit of a galvanometric type of recorder which provides a record advanced in synchronism with travel of the supporting cable. If the survey current is of sufficient magnitude to produce a resistitvity measure signal of strength necessary to actuate the indicating device 44, of course, the amplifier 40 may be eliminated from the measuring circuit.

Under widely varying borehole conditions, the indications of resistivity provided by device 44 may fluctuate rapidly as the electrode array 10 is moved. The rapid change of conditions encountered as the electrode array traverses the borehole also results in wide fluctuations in the potential difference between outer measuring electrodes $M_1$, $M_2$ and reference electrode N produced by the auxiliary current. The fluctuations effectively constitute a change in gain within the feedback loop and tend to result in wide variations in feedback loop gain. Whereas the loop gain must be high enough under all conditions to ensure that the potential difference between the outer measuring electrodes and reference electrode N is reduced within prescribed limits of accuracy toward zero, a change of borehole conditions with travel of the electrode array may increase the loop gain far beyond the value required for accuracy to an extent that a tendency toward instability and oscillation may arise. To avoid these wide excursions of the feedback loop gain, provision is made for regulating loop gain at a constant value which is sufficient to provide the desired accuracy. Since the changes in loop gain are attributable to changing resistivity conditions encountered by the auxiliary current, provision is made for passing an information signal from the current emitting electrodes together with the auxiliary current to experience the same conditions. By detecting a potential difference produced between outer measuring electrodes $M_1$, $M_2$ and reference electrode N by the information signal current, a gain control signal may be derived for adjusting the gain of variable gain amplifier 35 to regulate the loop gain.

To this end, the feedback loop circuit is rendered self-oscillatory at a frequency $f_i$ different from the frequency $f_0$ of the survey and auxiliary currents whereby an oscillatory information signal is circulated about the feedback loop. Such self-oscillation may be derived by imparting to variable gain amplifier 35 the gain and phase shift characteristics represented in Figs. 2 and 3, respectively. Referring to Fig. 2, a curve 48 is plotted to represent the values of the amplifier gain G as a function of frequency $f$ and characterizes amplifier 35 as being tuned to the frequency $f_0$ to yield a maximum gain $G_0$. For this frequency $f_0$ curve 49 of Fig. 3, plotted to represent amplifier phase shift as a function of frequency, shows a phase shift of 180°. In other words, the feedback provided by amplifier 35 is made degenerative by phase reversal in the amplifier at the frequency $f_0$ of the feedback signal.

Regenerative feedback, on the other hand, occurs at the frequency $f_1$ for which the phase shift is 360°. At this frequency $f_1$, the amplifier gain is $G_1$. In order to obtain a loop gain $G_L$ for the feedback signal which may, for example, have a value of 25 if an overall accuracy of 4% is adequate, the gain $G_1$ at the information frequency $f_1$ is made equal to the ratio of the maximum gain $G_0$ to the desired loop gain $G_L$ by suitably shaping the gain-characteristic curve 48. Such a shaping of the gain characteristics is accomplished, as is well known, by a suitable design of frequency sensitive coupling circuits for the amplifier 35. It follows, then, that adjusting the gain $G_1$ of amplifier 35 to obtain a unity loop gain at the information frequency $f_1$ results in a loop gain $G_L$ at the frequency $f_0$ which is of the desired constant magnitude.

To ensure a unity loop gain for the information signal, provision is made for regulating the magnitude of the current passed at the information signal frequency $f_1$ between the inner current emitting electrodes $A_3$, $A_4$ and the outer current emitting electrodes $A_5$, $A_6$. The magnitude of the information signal current is detected by applying the potential difference produced across a resistor 50 in series with the secondary winding of transformer 30 to the input of a pass filter 51 which selectively passes the component of the potential difference at the frequency $f_1$ to the input of a biased detector 52. The biased detector 52 may be of any suitable design which serves to supply a rectified version of the potential difference at the frequency $f_1$ developed across resistor 50 to the gain control circuit of variable gain amplifier 35 via conductor 54. By comparing this selected component of potential difference with a constant bias potential within detector 52, a gain control signal $e_c$ may be derived having a polarity determined by whether the selected potential component is above or below the bias potential and a magnitude corresponding to the departure of the selected potential component from the bias potential. The polarity with which the gain control signal $e_c$ is supplied to the gain control circuit of variable gain amplifier 35 is such as to effect degenerative control of the loop gain at frequency $f_1$, whereby the gain is adjusted to maintain the potential difference across resistor 50 at frequency $f_1$ at a constant reference value.

In addition to maintaining constant the current which is introduced into the formation at the information frequency $f_1$, the gain control circuit maintains the feedback loop gain at frequency $f_1$ at a value of unity. For any given setting of the gain $G_1$ of the amplifier 35 at the frequency $f_1$ to obtain this unity loop gain, the gain $G_0$ at the frequency $f_0$ is greater by a factor equal to the desired loop gain $G_L$ at the frequency $f_0$. The gain in other portions of the loop circuit at the frequencies $f_1$ and $f_0$ being the same, it follows that the loop gain $G_L$ is maintained constant at its desired value.

It may be observed that the information signal is circulated as a current at the frequency $f_1$ between the inner and outer current emitting electrodes but is not passed between these electrodes and a remote current return point, as is the survey current at frequency $f_0$. The potential difference produced by the information signal between outer measuring electrodes $M_1$, $M_2$ and reference electrode N at the frequency $f_1$ is not maintained substantially at zero but has a value which varies with borehole conditions. Passage of current at the information signal frequency $f_1$ between the inner and outer current emitting electrodes also produces a potential difference between inner measuring electrode $M_0$ and the remote reference electrode N. This potential difference between measuring electrode $M_0$ and a remote reference point produced at the frequency $f_1$ provides a measure of formation resistivity in accordance with the teachings of M. Schlumberger Patent No. 2,562,992, issued August 7, 1951, referring particularly to the embodiment of Fig. 5.

In accordance with the present invention then, the information signal which is produced to regulate the feedback loop gain may be further utilized to derive a measure signal at the frequency $f_1$ characterizing the formation resistivity differently from the measure signal at frequency $f_0$. To obtain indications of the measure signal at frequency $f_1$, cable conductor 41 is connected to one terminal of a selective pass filter 56, the other terminal of which is grounded at 43, to apply the measure signal at frequency $f_1$ to a second indicating device 57. Conveniently, indicating device 57 may simply be a second unit of a galvanometric recorder which includes indicating device 44 as a first unit, whereby the different indications of formation resistivity may be recorded simultaneously on the same record for ease of correlation with reference to the borehole depth.

In operation, the electrode array 10 together with housing 37 is lowered or raised through the borehole at a desired speed past the formations which are to be investigated. Power supplied from the source 20 energizes oscillator 25 to pass a constant survey current at a frequency $f_0$ from the current emitting electrodes and into the adjacent formations. At the same time, the variable gain amplifier 35 is energized by the potential difference of frequency $f_0$ produced between outer measuring electrodes $M_1$, $M_2$ and the remote reference electrode N to pass auxiliary current of such phase and magnitude between inner current emitting electrodes $A_3$, $A_4$ and outer current emitting electrodes $A_5$, $A_6$ as will reduce to substantially zero the potential difference of frequencye $f_0$ applied to the input of the variable gain amplifier 35. With the path of the survey current thereby confined for a relatively deep penetration into the adjacent formations, the potential difference produced at the frequency $f_0$ between inner measuring electrode $M_0$ and remote reference electrode N is amplified and selectively passed by filter 42 for recording by the indicating device 44.

At a regulated amplitude level, oscillations are maintained in the feedback loop circuit which includes variable gain amplifier 35, at the different frequency $f_1$. Such regulation is obtained by adjusting the gain of variable gain amplifier 35 inversely with departure of the current passed at frequency $f_1$ between the inner and outer current emitting electrodes from a fixed reference value. Not only does such regulation of the information signal current result in unity loop gain at the information signal frequency $f_1$ and the desired loop gain $G_L$ at the carrier frequency $f_0$, but also it maintains the constancy of the information signal current for ease of deriving separate, distinctive resistivity indications.

Whereas the resistivity indications obtained with the indicating device 44 are produced by the combined flow of the survey and auxiliary currents, indications provided by the device 57 selectively responsive to the frequency $f_1$ are produced solely by the current passing at the information signal frequency $f_1$ between the inner and outer current emitting electrodes. While the characteristics of the resistivity indications provided by devices 44 and 57 are more fully described, respectively, in aforementioned Patents 2,712,631 and 2,562,992, it is worthy of observation that the resistivity indications of device 44 correspond with a greater depth of lateral investigation than those of device 57 and tend to be more detailed due to the concentration of the survey current. Taken together, the respective indications obtained with devices 43 and 57 permit a more accurate analysis of the geological properties of the formations investigated and in particular, facilitate a determination of resistivities at different depths beyond the borehole wall.

In Fig. 4, there is illustrated an electrode array 60 which may be employed, in lieu of electrode array 10, with the apparatus of Fig. 1. The electrode array 60 is of the type disclosed in H. G. Doll Patent No. 2,712,629, and is arranged to be pressed in close electrical contact with the borehole wall for a more detailed investigation of formation resistivities representing a shallower depth of investigation.

To apply the electrode array 60 to the borehole wall, a cushion member 62 is provided having a flexible sealing face 63 which may conform with the borehole wall. The cushion member 62 may conveniently be supported from housing 37 by means including bowed springs 64, 65 which are flexed to urge the face 63 laterally into sealing contact with a borehole wall.

Centrally of the face 63, an inner measuring electrode $M_0$ is inlaid and has connections through the back of the cushion member 62 with conductor 39. Surrounding the inner measuring electrode $M_0$ is an inner current emitting electrode $A_3$, an outer current emitting electrode $A_5$ and an outer measuring electrode $M_1$, these electrodes $A_3$, $A_5$, and $M_1$ being inlaid in the face 63 of cushion member 62 at successively greater radial distances from the inner measuring electrode $M_0$. The electrodes may suitably be of circular or elliptical configuration concentric or confocal with the inner measuring electrode $M_0$. In the cross sectional view (Fig. 4) of the cushion member 62 taken longitudinally of the borehole, it is seen that each of electrodes $A_3$, $A_5$, and $M_1$ includes portions spaced above and below electrode $M_0$ in longitudinal aligment therewith. The inner and outer current emitting electrodes $A_3$ and $A_5$ have connection, respectively, with conductors 31 and 32, through the back of cushion member 62 while outer measuring electrode $M_1$ is similarly connected to conductor 34.

The operation of the apparatus of Fig. 1 with the electrode array 60 substituted for array 10 is substantially identical with that described above, although the path of the survey current is altered to conform with the geometry of the electrode array 60 and different characteristics are imparted to the resistivity indications obtained with devices 44 and 57.

The apparatus of Fig. 1 is susceptible of other modifications within the purview of the invention including, for example, substitution of an electrode array of the type disclosed in H. G. Doll Patent No. 2,712,628 wherein elongated electrodes are spaced above and below a central electrode, the central electrode performing the functions of electrodes $M_0$, $A_3$, and $A_4$ in Fig. 1 and the elongated electrodes serving the functions of electrodes $A_5$, $A_6$, $M_1$ and $M_2$. In lieu of the connection of conductor 28 to the midtap of the secondary winding for transformer 30, conductor 28 may be connected directly to electrodes $A_3$ and $A_4$ to avoid passage of the survey current through the resistor 50. Other means may be employed for establishing and regulating the information signal and means other than a galvanometric-type recorder may be employed to secure resistivity indications. Accordingly, the invention is not to be limited to the specific embodiments shown and described but is of a scope defined in the appended claims.

I claim:

1. In apparatus for investigating earth formations traversed by a borehole, the combination comprising a first current electrode, a second current electrode positioned adjacent said first current electrode, said electrodes being mounted for movement longitudinally through a borehole, electric source means coupled to said first electrode and to a remote current return point for passing survey current from said first electrode into adjacent formations, a feedback circuit including variable gain means responsive to the potential difference produced between a point in the vicinity of said second electrode and a remote reference point for passing auxiliary current between said current electrodes tending to reduce said potential difference, said feedback circuit being oscillatory at a frequency different from the frequency of said survey current to pass an information signal between said current electrodes of constant amplitude, means responsive to the potential difference produced by said survey and auxiliary currents between a point in the vicinity of said first electrode and a remote reference point for deriving a first measure signal representing formation resistivity, and means responsive to a potential difference produced by said information signal between a point in the vicinity of said first electrode and a remote reference point for deriving a second measure signal representing formation resistivity.

2. In apparatus for investigating earth formations traversed by a borehole, the combination comprising a central measuring electrode, a first current emitting electrode having portions spaced above and below said central electrode, a second current emitting electrode having portions spaced above and below said first electrode, said electrodes being mounted for movement longitudinally through a borehole, electric source means coupled to said first electrode and to a remote current return point for passing survey current from said first electrode into adjacent formations, a feedback circuit including a variable gain amplifier responsive to the potential difference between a measuring point in the vicinity of said second electrode and a remote reference point for passing auxiliary current between said current emitting electrodes with a phase and magnitude tending to produce a potential difference cancelling the potential difference produced between said measuring and reference points by said survey current, said feedback circuit being energized to pass an information signal between said current electrodes having a frequency different from the frequency of said survey current, means responsive to said information signal for adjusting the gain of said variable gain amplifier to maintain said information signal constant, means responsive to the potential difference produced by said survey and auxiliary currents between said central electrode and a remote reference point for deriving a first measure signal representing formation resistivity, and means responsive to a potential difference produced by said information signal between said central electrode and a remote reference point for deriving a second measure signal representing formation resistivity.

3. In apparatus for investigating earth formations traversed by a borehole, the combination comprising a central measuring electrode, an inner current emitting electrode having portions spaced above and below said central electrode, an outer current emitting electrode having portions spaced above and below said inner electrode, said electrodes being mounted for movement longitudinally through a borehole, electric source means coupled to said inner electrode and to a remote current return point for passing survey current from said inner electrode into adjacent formations, a feedback circuit including a variable gain amplifier responsive to the potential difference produced between a measuring point spaced outwardly of said outer electrode and a remote reference point for passing auxiliary current between said current electrodes with a phase and magnitude tending to produce a potential difference between said measuring and reference points cancelling the potential difference produced therebetween by said survey current, said feedback circuit providing a loop which is oscillatory at a frequency different from the frequency of said auxiliary current, means responsive to departures of said information signal from a reference value to adjust the gain of said variable gain amplifier an amount restoring said information signal to its reference value thereby to maintain the loop gain for said information signal at unity, and means responsive to the potential difference produced by said survey and auxiliary currents between said central measuring electrode and a remote reference point for obtaining indications of formation resistivity.

4. In apparatus for investigating earth formations traversed by a borehole, the combination comprising a central measuring electrode, an inner current emitting electrode having portions spaced above and below said central electrode, an outer current emitting electrode having portions spaced above and below said inner electrode, said electrodes being mounted for movement longitudinally through a borehole, electric source means coupled to said inner electrode and to a remote current return point for passing survey current from said inner electrode into adjacent formations at a given frequency, a variable gain amplifier responsive to the potential difference produced between a point spaced outwardly of said outer electrode and a remote reference point and having its output circuit coupled to said current electrodes for passing auxiliary current therebetween with a phase and magnitude tending to produce a potential difference between said points canceling the potential difference produced therebetween by said survey current thus to provide a feedback loop, said amplifier having oscillatory gain and phase shift characteristics for passing an oscillatory information signal between said current electrodes, a resistor in series with the output circuit of said amplifier, means including a biased detector responsive to the potential difference produced across said resistor by flow of said information signal therethrough to adjust the gain of said variable gain amplifier by an amount tending to maintain said information signal at a constant level, thereby to maintain the loop gain substantially constant, and means responsive to the potential difference produced between said central electrode and a remote reference point by said survey and auxiliary currents for obtaining indications of formation resistivity.

5. In apparatus for investigating earth formations traversed by a borehole, the combination comprising a central measuring electrode, an inner current emitting electrode having portions spaced above and below said central electrode, an outer current emitting electrode having portions spaced above and below said inner electrode, an outer measuring electrode including portions spaced outwardly of said outer current emitting electrode, said electrodes being mounted for movement longitudinally through a borehole, electric source means coupled to said inner electrode and to a remote current return point for passing survey current from said inner electrode into adjacent formations, a feedback circuit including a variable gain amplifier responsive to the potential difference produced between said outer measuring electrode and a remote reference point for passing auxiliary current between said current emitting electrodes with a phase and magnitude tending to produce a potential difference between said outer measure electrode and remote reference point equal and opposite to the potential difference produced therebetween by said survey current, said amplifier having gain and phase shift characteristics rendering said feedback circuit oscillatory at a frequency different from the frequency of said auxiliary current to circulate an oscillatory current between said current emitting electrodes, means responsive to said oscillatory current for adjusting the gain of said variable gain amplifier to maintain said oscillatory current at a reference value, frequency sensitive means responsive to the potential difference produced by said survey and auxiliary currents between said central measuring electrode and a remote reference point for deriving a first measure signal representing formation resistivity, and means sensitive to the frequency of said oscillatory current and responsive to a potential difference produced by said oscillatory current between said central measuring electrode and a remote reference point for deriving a second measure signal representing formation resistivity.

6. In apparatus for investigating earth formations traversed by a borehole, the combination as defined in claim 5 wherein said electrodes are longitudinally aligned whereby cancellation of potential differences produced between said outer measuring electrode and a remote reference point by said survey and auxiliary currents tends to confine said survey current to a path extending laterally of said inner electrode for a considerable radial distance.

7. In apparatus for investigating earth formations traversed by a borehole, the combination as defined in claim 5 which further comprises a cushion member having a face for conforming and sealing with the borehole wall, said inner and outer electrodes surrounding said central electrode and inlaid with the same in the face of said cushion member.

8. In apparatus for investigating earth formations traversed by a borehole, the combination comprising: means for passing survey current from a region in the borehole into adjacent earth formations; means for emitting auxiliary current in the borehole in said region for controlling the flow pattern of said survey current; one of said means including adjustable-gain feedback means responsive to a potential difference in said region for adjusting the current emitted thereby for maintaining a desired survey current pattern; means for introducing a distinguishable information signal current in the borehole in said region; means responsive to the information signal current for regulating the gain of said feedback means; means responsive to the flow of at least one of said survey and auxiliary currents for providing a first measure signal representative of formation resistivity; and means responsive to the flow of information signal current for providing a second measure signal representative of formation resistivity.

References Cited in the file of this patent
UNITED STATES PATENTS

| | | |
|---|---|---|
| 2,712,628 | Doll | July 5, 1955 |
| 2,712,629 | Doll | July 5, 1955 |
| 2,712,631 | Ferre | July 5, 1955 |
| 2,770,771 | Schuster | Nov. 13, 1956 |